(12) United States Patent
Amidon et al.

(10) Patent No.: US 7,693,906 B1
(45) Date of Patent: Apr. 6, 2010

(54) METHODS, SYSTEMS, AND PRODUCTS FOR TAGGING FILES

(75) Inventors: Christopher M. Amidon, Apex, NC (US); Patricia Scardino, Apex, NC (US); Gary Black, Cary, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 250 days.

(21) Appl. No.: 11/507,898

(22) Filed: Aug. 22, 2006

(51) Int. Cl.
*G06F 7/00* (2006.01)
*G06F 17/30* (2006.01)

(52) U.S. Cl. .................................................. 707/749
(58) Field of Classification Search .................... 707/3, 707/102
See application file for complete search history.

(56) References Cited

U.S. PATENT DOCUMENTS

| | | | | |
|---|---|---|---|---|
| 5,774,121 A * | 6/1998 | Stiegler | .............. | 715/769 |
| 5,987,456 A * | 11/1999 | Ravela et al. | .............. | 707/5 |
| 6,144,968 A | 11/2000 | Zellweger | | |
| 6,408,301 B1 | 6/2002 | Patton et al. | | |
| 6,484,156 B1 | 11/2002 | Gupta et al. | | |
| 6,760,884 B1 | 7/2004 | Vertelney et al. | | |
| 6,954,543 B2 | 10/2005 | Svendsen et al. | | |
| 7,028,267 B1 | 4/2006 | Beezer et al. | | |
| 7,032,182 B2 | 4/2006 | Prabhu et al. | | |
| 7,058,624 B2 * | 6/2006 | Masters | ............. | 707/3 |
| 7,099,860 B1 * | 8/2006 | Liu et al. | ............. | 707/3 |
| 7,127,164 B1 * | 10/2006 | Parulski et al. | ............. | 396/287 |
| 7,254,587 B2 * | 8/2007 | Lee et al. | ............. | 707/104.1 |
| 7,321,919 B2 * | 1/2008 | Jacobs et al. | ............. | 709/205 |
| 7,363,649 B2 * | 4/2008 | Marsh | ............. | 725/114 |
| 2002/0049738 A1 * | 4/2002 | Epstein | ............. | 707/1 |
| 2002/0087546 A1 | 7/2002 | Slater et al. | | |
| 2002/0107829 A1 | 8/2002 | Sigurjonsson et al. | | |
| 2003/0033296 A1 | 2/2003 | Rothmuller et al. | | |
| 2003/0217121 A1 * | 11/2003 | Willis | ............. | 709/219 |
| 2004/0059754 A1 | 3/2004 | Barghout et al. | | |
| 2004/0177063 A1 * | 9/2004 | Weber et al. | ............. | 707/3 |
| 2005/0216457 A1 * | 9/2005 | Walther et al. | ............. | 707/4 |
| 2005/0246374 A1 | 11/2005 | Blinn et al. | | |
| 2007/0156726 A1 * | 7/2007 | Levy | ............. | 707/100 |
| 2007/0185858 A1 * | 8/2007 | Lu et al. | ............. | 707/5 |

* cited by examiner

*Primary Examiner*—James Trujillo
*Assistant Examiner*—Jorge A Casanova
(74) *Attorney, Agent, or Firm*—Withrow & Terranova, PLLC

(57) ABSTRACT

Methods, systems, and products are disclosed for tagging files. Metadata is associated to files, and subjective metadata is assigned to the metadata. Any metadata common to multiple files may have different subjective metadata. Tags, for example, may be associated to the files, and a subjective level of importance may be assigned to each tag. Any tag that is commonly assigned to different files may thus have different levels of importance.

18 Claims, 7 Drawing Sheets

METHODS, SYSTEMS, AND PRODUCTS FOR TAGGING FILES

BACKGROUND

This application generally relates to computers and, more particularly, to tagging, searching, sorting, and retrieving stored files.

Computer users may be overwhelmed by files. As users add digital images and music to their word processing and other stored files, users may have hundreds, if not thousands, of files stored in memory. Finding a desired file may be a challenge, even with a meticulous file management system. Tags, keywords, and other metadata have been used to help identify files, but these schemes treat all metadata as being equal. That is, even though a file may be associated with one or more tags, currently no scheme exists for prioritizing the tags. A digital photo file, for example, may be tagged with "Chris," "vacation," and "beach," but no tag may be designated as having priority. What is needed, then, are methods, systems, and products that tag files using a prioritizing or leveling scheme.

SUMMARY

The problems noted above, along with other problems, may be reduced or eliminated by methods, systems, and products that tag files. This invention establishes a scheme for tagging a file with metadata and with descriptive metadata. The descriptive metadata is any information that helps describe the metadata. The descriptive metadata, for example, may indicate an importance of a tag assigned to a file. As metadata, or tags, are assigned to a file, the descriptive metadata may indicate an importance of one or more tags associated with the file. As a user associates one or more tags to the file, the user may assign an arbitrary, hierarchical arrangement to the tags. That is, as the user assigns multiple tags to the same file, the user may subjectively assign a level of importance to each tag, based on the content of the file. The user may arbitrarily assign any importance to one or multiple tags, without resorting to a pre-defined hierarchy. The present invention thus establishes a leveling or priority scheme in which one or multiple tags may be assigned to a file, and each tag has a level of importance. The user may even search, sort, filter, and retrieve files, based on the importance of the tags associated with the files.

According to aspects of the present invention, a method is disclosed for tagging files. Any type of metadata is associated to files, and descriptive metadata may also be assigned to the metadata. The descriptive metadata describes the metadata, such that any metadata common to multiple files may have different descriptive metadata.

According to another aspect of the present invention, another method is disclosed for tagging files. Here tags may be associated to files, and a subjective level of importance may be assigned to each tag. Any tag that is commonly assigned to different files may thus have different levels of importance.

According to another aspect of the present invention, a system is disclosed for tagging files. The system has a media management application stored in memory, and a processor communicates with the memory and executes the media management application. The system associates tags to files and assigns a subjective level of importance to each tag. Any tag that is commonly assigned to different files may have different levels of importance.

In yet another aspect, a computer program product tags files. The computer program product comprises computer-readable media storing processor-executable instructions. The instructions cause a processor to associate tags to files, and a subjective level of importance may be assigned to each tag. Any tag that is commonly assigned to different files may thus have different levels of importance.

Other aspects, including systems, methods, and/or computer program products according to the present invention will be or become apparent to one with ordinary skill in the art upon review of the following drawings and detailed description. Such additional aspects, including systems, methods, and/or computer program products, are included within the scope of the present invention.

BRIEF DESCRIPTION OF THE SEVERAL VIEWS OF THE DRAWINGS

The accompanying drawing figures incorporated in and forming a part of this specification illustrate several aspects, features, principles and advantages of the present invention, and together with the Detailed Description serve to better explain the aspects, features, principles, and advantages of the invention.

DETAILED DESCRIPTION

The present invention now will be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will convey the invention to those skilled in the art.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
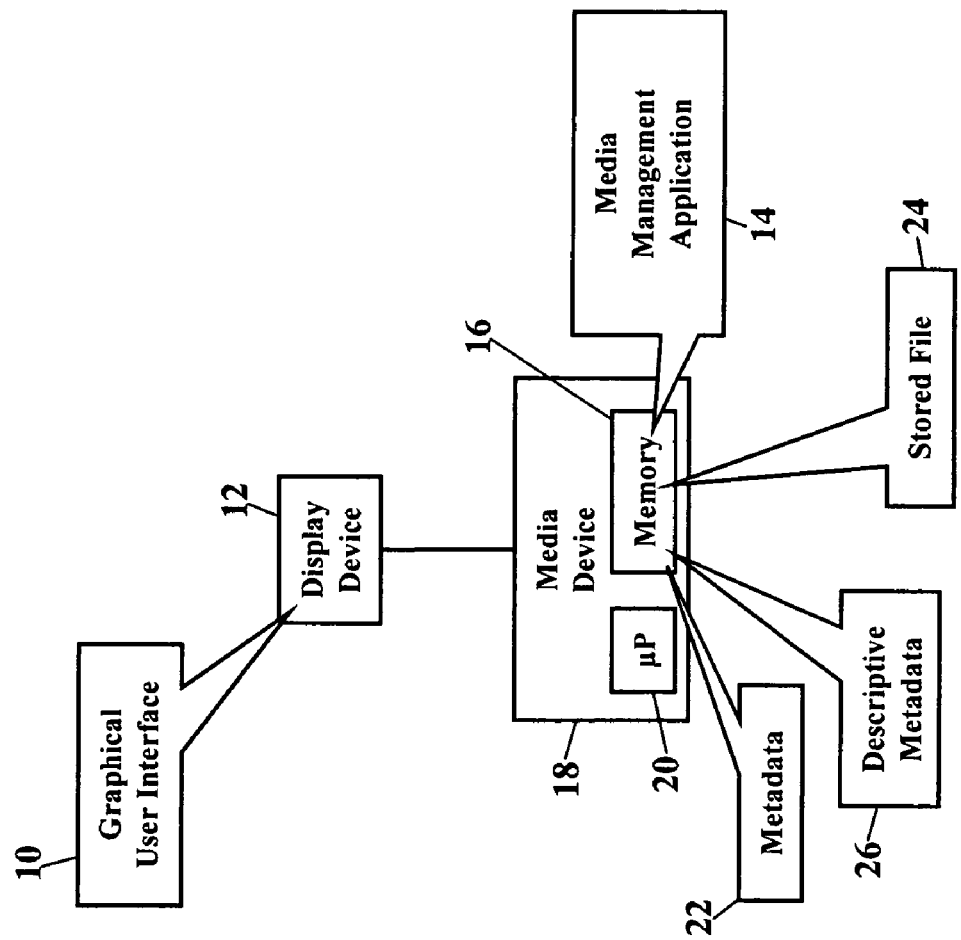
FIG. 1 is a schematic illustrating an environment in which aspects of the present invention may be implemented.

FIG. 1 is a schematic illustrating an environment in which the present invention may be implemented. A graphical user interface 10 is visually presented on a display device 12 by a media management application 14. The media management application 14 is a set of processor-executable instructions that are stored in memory 16 of a media device 18. Although the media device 18 is generically shown, the media device 18, as will be later explained, may be a computer, a personal digital assistant (PDA), a cordless/cellular/IP phone, or any other processor-controlled device. Whatever the media device 18, the media device 18 has a processor 20 (e.g., "µP"), application specific integrated circuit (ASIC), or other similar device that executes the media management application 14. The media management application 14 is a software engine that associates metadata 22 to a stored file 24. The metadata 22 may comprise one or more tags, keywords, annotations, links, and/or descriptors that mark, identify, and/or are associated with the file 24. The file 24 is stored in the memory 16 of the media device 18, and the stored file 24 may include any content, data, and/or information. The stored file 24, for example, may include text data, image data, and/or any media information. The file 24 may include any media, whether movie, picture, image, music, text, links, programs, word processing document, spreadsheet document, and/or data.

Regardless of the content contained within the file 24, the file 24 may also be associated with descriptive metadata 26. That is, a user may assign the metadata 22 to the stored file 24, and the user may also assign the descriptive metadata 26 to the metadata 22. The descriptive metadata 26 may be any information that describes the metadata 22. The descriptive metadata 26, for example, may be any tags, keywords, annotations, links, and/or descriptors that mark, identify, and/or are associated with the metadata 22. The descriptive metadata 26 may be any information that may be used to explain, interpret, and/or clarify the metadata 22. The descriptive metadata 26 may thus be "metadata about metadata" that is assigned to, or associated with, the file 24. The present invention maintains any relationship between the file 24, the metadata 22, and the descriptive metadata 26, such that the file 24 may be accessed, searched, sorted, and/or retrieved, based on the metadata 22 and/or the descriptive metadata 26.

The media device 18 may be any communications device. The media management application 14, for example, may operate within a set-top box, a personal/digital video recorder, personal digital assistant, a Global Positioning System device, a television, an Internet Protocol phone, a pager, a cellular/satellite phone, or any computer system and/or communications device utilizing a digital signal processor. The media device 18 may also include watches, radios, vehicle electronics, clocks, printers, gateways, and other apparatuses and systems. Moreover, the media management application 14 and/or the media device 18 may operate in a client-server environment, as is well known to those of ordinary skill in the art.

The media device 18, however, is only simply illustrated. Because the architecture and operating principles of media devices are well known, the hardware and software components of the media device 18 are not further shown and described. If the reader desires more details, the reader is invited to consult the following sources, all incorporated herein by reference in their entirety: ANDREW TANENBAUM, COMPUTER NETWORKS (4th edition 2003); WILLIAM STALLINGS, COMPUTER ORGANIZATION AND ARCHITECTURE: DESIGNING FOR PERFORMANCE (7th Ed., 2005); and DAVID A. PATTERSON & JOHN L. HENNESSY, COMPUTER ORGANIZATION AND DESIGN: THE HARDWARE/SOFTWARE INTERFACE (3rd. Edition 2004).

Figure 2:
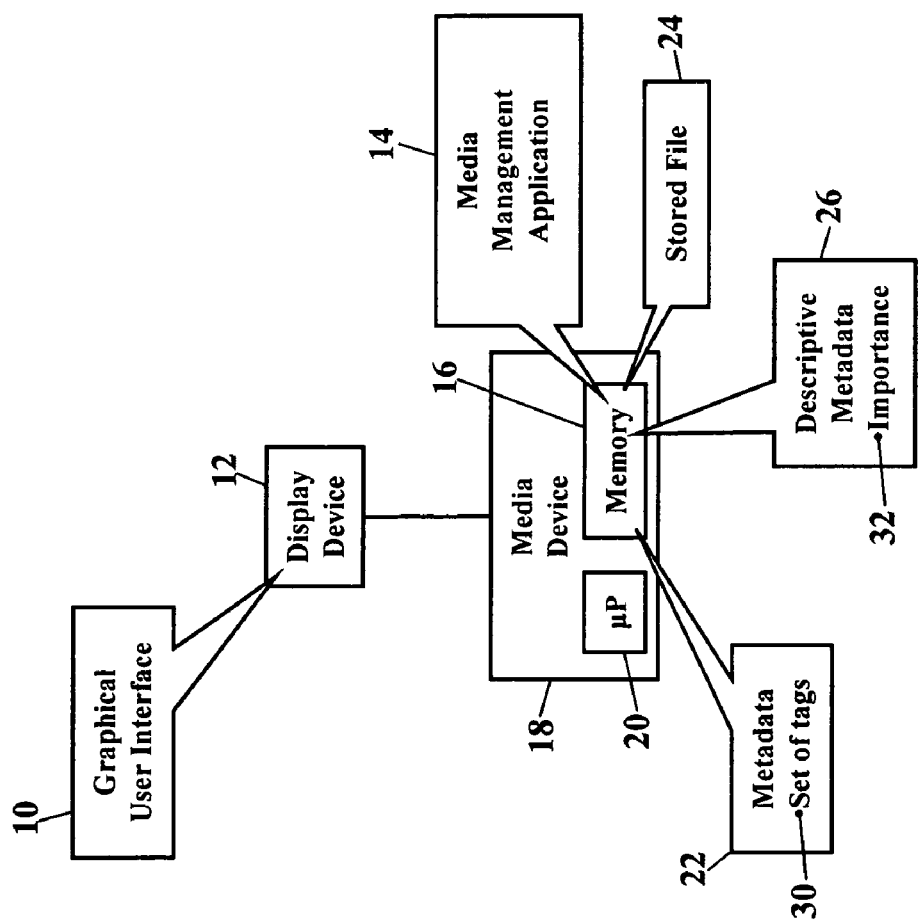
FIG. 2 is a schematic illustrating descriptive metadata, according to more aspects of the present invention.

FIG. 2 is a schematic further illustrating the descriptive metadata 26, according to more aspects of the present invention. Here the metadata 22 is illustrated as a set 30 of tags, and the descriptive metadata 26 describes an importance 32 associated with each tag or a group of tags. As a user of the media management application 14 assigns the set 30 of tags to the file 24, the user may also assign an importance 32 to each tag. The user may even assign an importance 32 to a group of multiple tags. If the user desires, the user may assign the same importance 32 to all the tags associated with the file 24, or the user may assign different values of importance to some or all of the tags. The present invention thus allows the user to assign or designate a leveling or priority scheme to the descriptive metadata 26, such that some tags may be more important than other tags assigned to the same file 24. Even if the user assigns the same tag to different files, the user may assign different levels or values of importance to the tags. The importance 32 may be completely arbitrary and/or subjective and need not conform to an established or predetermined/predefined hierarchy.

Figure 3:
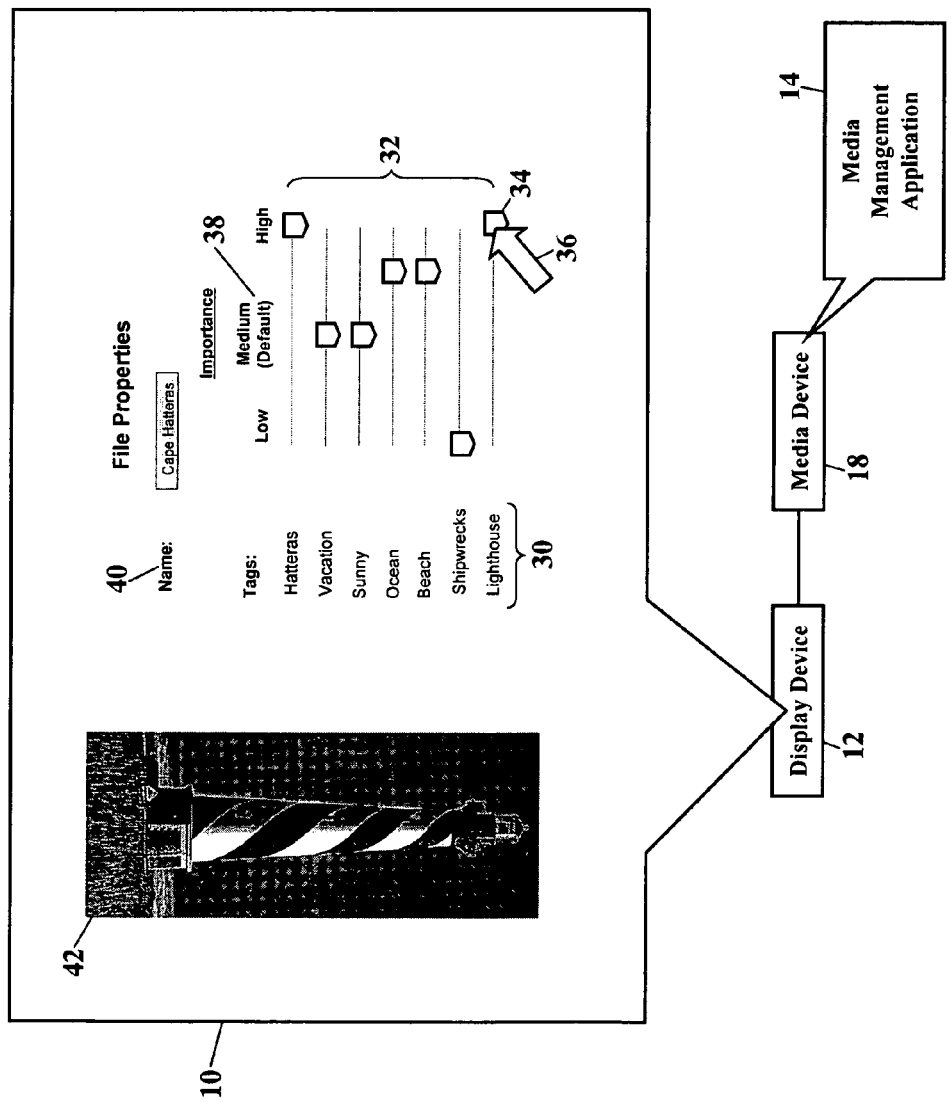
FIG. 3 is a schematic illustrating a graphical user interface, according to additional aspects of the present invention.

FIG. 3 is a schematic illustrating the graphical user interface 10, according to more aspects of the present invention. The graphical user interface 10 accepts user inputs or commands to assign an importance to each tag. Here the graphical user interface 10 visually and/or audibly presents the set 30 of tags associated with the file 24. The graphical user interface 10 also includes at least one control 34 associated with the set 30 of tags. The control 34 permits the user to assign a level of importance to one or more tags in the set 30 of tags. While FIG. 3 illustrates one control for each tag, other aspects of the present invention may associate one control for more than one tag. While any control may be used, a slider control 34 is shown, but radio buttons and/or pull-down lists are equally applicable. The user may position a cursor 36 on the slider control 34 and drag to indicate the importance of the tag. The user, for example, may assign or change a tag's importance from a "low" level or priority to a "high" level or priority. Each tag's importance may include any range between a maximum importance and a minimum importance, with any number or range of graduations within this maximum/minimum importance. Note that the slider control 34 may be utilized independently of a maximum and minimum numerical value, such that the slider control 34 simply indicates "low" at one end and "high" at an opposite end. As later paragraphs will explain, the media management application 14 may equate or associate numeric values to "high," "medium," and "low" importance.

Each tag's importance may be subjective. The graphical user interface 10 produced by the media management application 14 provides the ability for the user to indicate the importance of one or more tags. The user, for example, may assign a weight to each tag, such that tags with greater weights have more influence. Each tag's importance, however, may additionally or alternatively be established using levels and/or priorities. Any number of schemes, in fact, may be utilized to distinguish the importance or relevance of one tag to another. The media management application 14, for example, may use n-tiers of levels of importance, with n representing an integer number. A simple 3-tier hierarchical scheme (such as "high," "medium," and "low" importance) may be used. A more sophisticated scheme, with many levels of importance, may be implemented for fine-grained results. Still another scheme may utilize values of importance, such as the set (1, n), where n may be any number (preferably an integer value).

The number of levels of importance, however, may influence the complexity of the graphical user interface 10. Levels of importance in the range of (1, 5) may be easier to manage than a range of (1, 100). Some users may desire more simple measures of importance, such as "primary," "incidental," and/or "secondary."

Default levels of importance may also be used. When the set 30 of tags is associated to a given stored file 24, the media management application 14 may assign an initial or default level 38 of importance to one or more tags. That is, one or more default levels 38 of importance are assigned to each tag, and the user may edit or change each tag's default level 38 of importance. The media management application 14 thus ensures that each tag has an assigned importance, but the user may change that importance. Alternatively, the media management application 14 may await user-assignment of importances. If the user fails or declines to assign an importance to any tag, then the media management application 14 may assign the initial or default level 38 of importance to the tag. However defaults are assigned, in this embodiment the media management application 14 defaults to a "medium" or middle level or priority (as FIG. 3 illustrates). There may additionally be some tags, or types of tags, that also default to a higher or lower level of importance. Suppose, for example, that the stored file 24 is a digital photo, and the digital photo is associated with tags. If the user has associated some tags that do not directly address the "subject matter" of the photo, then those tags may default to a lower level of importance. Other tags, however, may default to higher levels of importance, such as a child's name. Default values of importance, then, may assist the user in quickly establishing tags. The user, however, may change the importance of any tag at any time, even default values.

The graphical user interface 10 may display other information associated with the file 24. The graphical user interface 10, for example, may include a name 40 associated with the stored file 24 (such as a filename). The graphical user interface 10 may also display a picture or image 42 associated with the file 24. FIG. 3, for example, illustrates a thumbnail image associated with the file 24.

Figure 4:
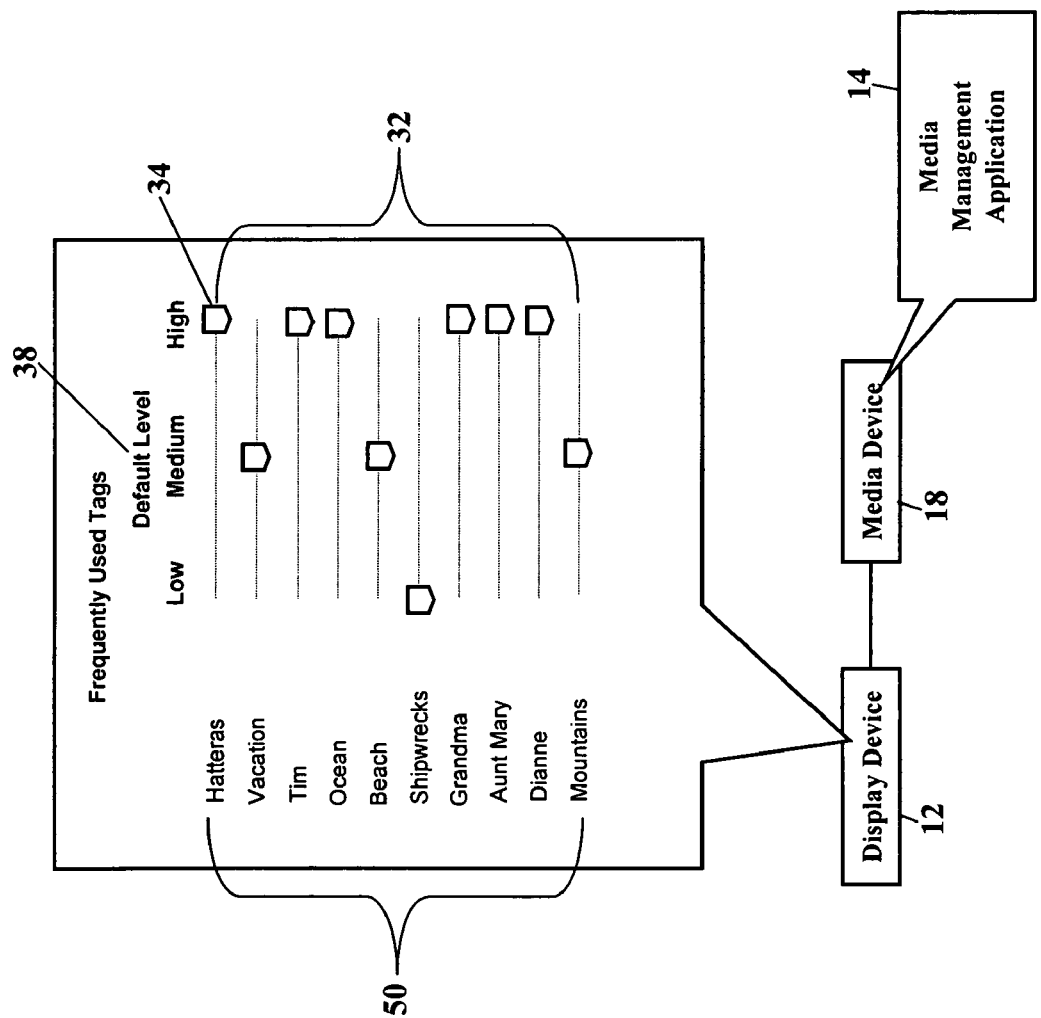
FIG. 4 is a schematic illustrating a list of frequently-used tags, according to even more aspects of the present invention.

FIG. 4 is a schematic illustrating a list 50 of frequently-used tags, according to even more aspects of the present invention. Here the media management application 14 stores or tracks the user's frequency of use for each tag. When the user wishes to associate tags to a file, the graphical user interface 10 may then visually and/or audibly present/display the list 50 of frequently-used tags. The user, then, may quickly choose tags from the list 50, thus simplifying the process of tagging a file. Moreover, the media management application 14 stores or tracks the default importance 38 assigned to each tag in the list 50 of frequently-used tags. As the user assigns tags to a file, the media management application 14 also associates each tag's corresponding importance 32. The media management application 14 additionally allows the user to access the list 50 of frequently-used tags and make edits. The user, for example, may wish to revise a tag name or a tag's default importance.

Figure 5:
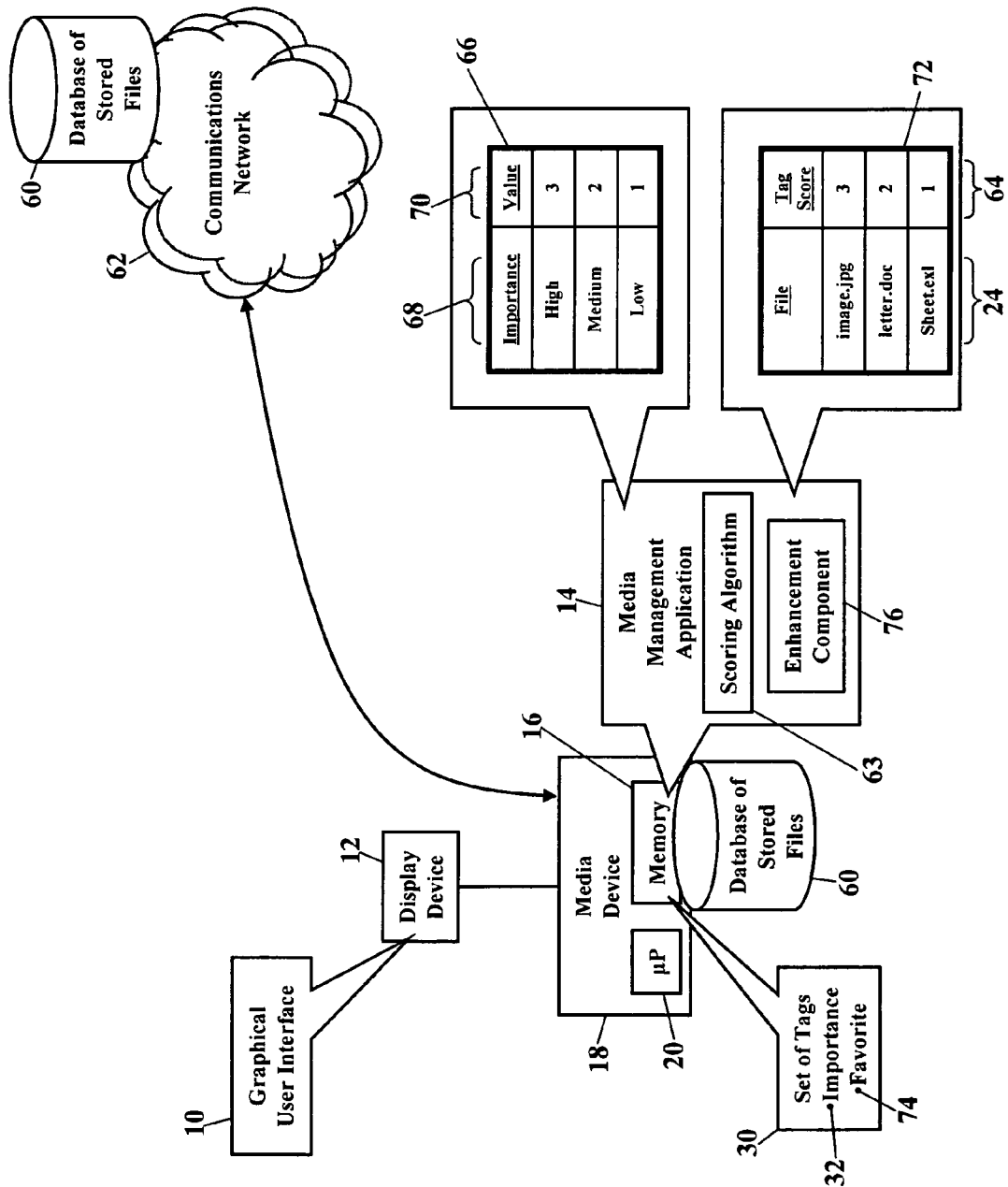
FIG. 5 is a schematic illustrating another operating environment, according to yet more aspects of the present invention.

FIG. 5 is a schematic illustrating another operating environment, according to additional aspects of the present invention. Here the user maintains a database 60 of stored files. The database 60 of stored files comprises a collection of any files that are tagged for identification. In this embodiment the database 60 stores digital images, yet, again, the database 60 may store files of any media. The database 60 of stored files is shown locally stored in the memory 16 of the media device 18. The database 60 of stored files, however, may additionally or alternatively be remotely maintained at some location that is accessible via a communications network 62.

At least some of the stored files are tagged with importance. The user assigns the set 30 of tags to one or more files stored in the database 60 of stored files. As the above paragraphs explained, the graphical user interface 10 permits the user to associate the importance 32 to any tag in the set 30 of tags. Because each tag may have an associated importance, the stored files may be accessed based on an importance of a tag. That is, the user may query or instruct the media management application 14 to determine what files in the database 60 of stored files are associated with a particular importance. The media management application 14, for example, may query the database 60 for a search query and then sort or arrange the query results according to an importance of a tag. The media management application 14 may even query or filter for any files having a particular importance. The media management application 14 may thus arrange a listing of the stored files according to the importance of the tag. The user may thus use a tag's associated importance to enhance retrieval of relevant files.

Some examples provide an explanation. Suppose that the user desires to find all stored photo images that are tagged with "Suzie." The media management application 14 thus accesses and queries the database 60 for the tag "Suzie." The query results are returned to the media management application 14, and the media management application 14 instructs the processor 20 to visually present a listing of the query results on the display device 12. If there is more than one file tagged with "Suzie," the media management application 14 may sort or arrange the query results according to the tag's importance. For example, any files that are tagged with "Suzie" and an associated "high" importance may be sorted to a top of the query results. Those files tagged with "Suzie" and an associated "medium" importance may be presented next, and files associated with a "low" importance of "Suzie" are listed last. The query results, then, may be arranged according to an importance or order of priority associated with the tag.

The user may even query with a tag's importance. If the user desires narrower search results, the user may query for a tag and its associated importance. Suppose that the user desires to find all stored photo images that are tagged with "Suzie" and have a "high" importance. The media management application 14 thus accesses and queries the database 60 for the tag "Suzie" with an associated "high" importance. The query results are returned to the media management application 14 and are visually/audibly presented to the user. Here, however, files tagged with "Suzie," but only having "medium" or "low" importance, may be filtered or eliminated from the query results. Because the media management application 14 permits queries based on importance, the user is thus permitted to narrow their query and, thus, only obtain the files that are most relevant to current needs.

The user may also query based only on importance. Suppose the user wishes to only find files that are tagged with a "high" importance. The actual tag, keyword, or annotation is not important—the user only wants to find files with "high" importance. The media management application 14 thus accesses and queries the database 60 for any tag having an associated "high" importance. Here, then, the tag's actual name or label may be treated as a "wildcard." The query results thus provide a listing of files having any tag name associated with "high" importance. The results may even be sorted by the number of tags that were associated with "high" importance.

The media management application 14 may also dynamically calculate a tag score for each file. When the user tags a file with multiple tags and, thus, multiple importances (as FIG. 3 illustrates), the present invention also includes a scheme for evaluating those importances. The media management application 14 may include a scoring algorithm 63. The scoring algorithm 63 is used to compute a tag score 64 for each file in the database 60 of stored files. As FIG. 5 illustrates, the media management application 14 accesses a table 66 stored in the memory 16. The table 66 associates or maps each level of importance 68 to a value 70. A "high" level importance, for example, may have an associated numerical value of "3." The "medium" and "low" levels of importance may, respectively, have associated values of "2" and "1." The user may populate or configure the table 66 to include any values desired, or the media management application 14 may retrieve default values for each numerical value. The table 66 may be more complex and map many levels of importance to their associated numerical values.

The media management application 14 may score each file. The media management application 14 retrieves the values 70 from the table 66 and uses the scoring algorithm 63 to dynamically compute the tag score 64 for each file. The scoring algorithm 63 may be any mathematical expression of any complexity. Here, however, the scoring algorithm 63 will be explained as a simple summation of the values 70 for each level 68 of importance associated with each tag. That is, if a file is associated with three (3) tags, each having a "high" importance, then that file's tag score is nine (e.g., 3+3+3=9). If a file is associated with three tags of "low" importance, then that file's tag score is three (1+1+1=3). More complex scoring algorithms may emphasize, or de-emphasize, certain levels of importance, and weighting factors or coefficients may be used to tailor the overall tag score. The media management application 14 also maintains a scoring table 72 that associates each stored file 24 to its corresponding tag score 64.

The tag score 64 may also be used to access stored files. Once the media management application 14 computes the tag score 64 for each file 24 in the database 60 of stored files, the tag scores may be searched, sorted, and/or filtered. That is, the user may query or instruct the media management application 14 to determine what files in the database 60 of stored files have a particular tag score or range of tag scores. The user, for example, may wish to find all files having a tag score 64 greater than five (5). Whatever the scoring query, the media management application 14 queries the scoring table 72 for the scoring query. The media management application 14 may then sort or arrange the query results according to tag score. The user may also query for more sophisticated query results, such as all files tagged with "Suzie" and having a tag score 64 greater than ten (10). The media management application 14 may then filter or remove any files where the tag score does not match or satisfy the scoring query. Suppose a file is tagged with "Suzie" and with several other tags. If the user queries for files tagged with "Suzie," the media management application 14 ignores or does not compute tag scores for the other tags. The media management application 14 may even accept a query search for multiple tags and/or for files associated with multiple tags. The media management application 14 may then calculate an overall tag score for multiple tags. The user may thus use the overall tag score 64 to enhance retrieval of relevant files.

The user may also establish a preeminent or "favorite" tag 74. Because the database 60 of stored files may store many files of multiple media, the user may designate one or files with a paramount or supreme indicator. For example, files identified by the user as a "favorite" may be more meaningful and, thus, more likely to be a desirable search result. The media management application 14, then, may adjust tag scores when a file is designated as a "favorite." Suppose, for example, the user tags one or more digital image files as "favorites." As the media management application 14 computes the tag score 64 for each file 24, those files designated as "favorites" may have their tag scores adjusted to reflect their preeminence or overall importance. The scoring algorithm 63, then, may include a score enhancement component 76 for those files designated as more important (e.g., "favorites"). Again, although the score enhancement component 76 may utilize any mathematical means for enhancing scores, the score enhancement component 76 may simply adjust the tag score 64 by a percentage multiplier. Those files associated with the preeminent or "favorite" tag 74, for example, may have their overall tag score 64 multiplied by fifty percent (e.g., 1.5) to emphasize their prominence.

Figure 6:
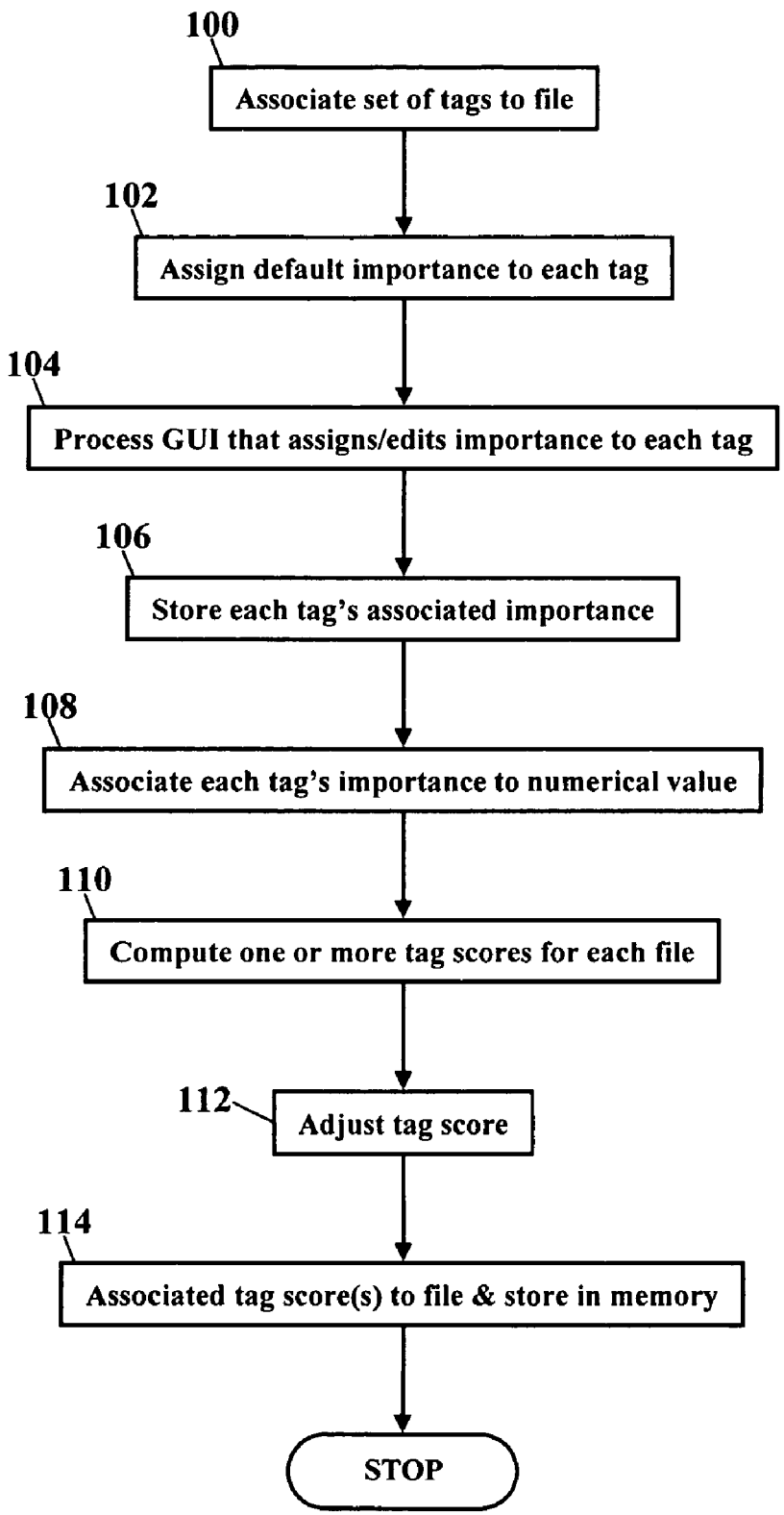
FIG. 6 is a flowchart illustrating a method of tagging files, according to more aspects of the present invention.

FIG. 6 is a flowchart illustrating a method of tagging files, according to additional aspects of the present invention. A set of tags is associated to a file (Block 100). A default level of importance is assigned to each tag (Block 102). A graphical user interface is processed that assigns or edits a level of importance for any tag (Block 104). Each tag's associated importance is stored (Block 106). Each tag's associated importance is associated to a numerical value (Block 108). One or more tag scores are computed (Block 110), and any tag score may be adjusted (Block 112). The one or more tags scores are associated to the file and stored in memory (Block 114).

Figure 7:
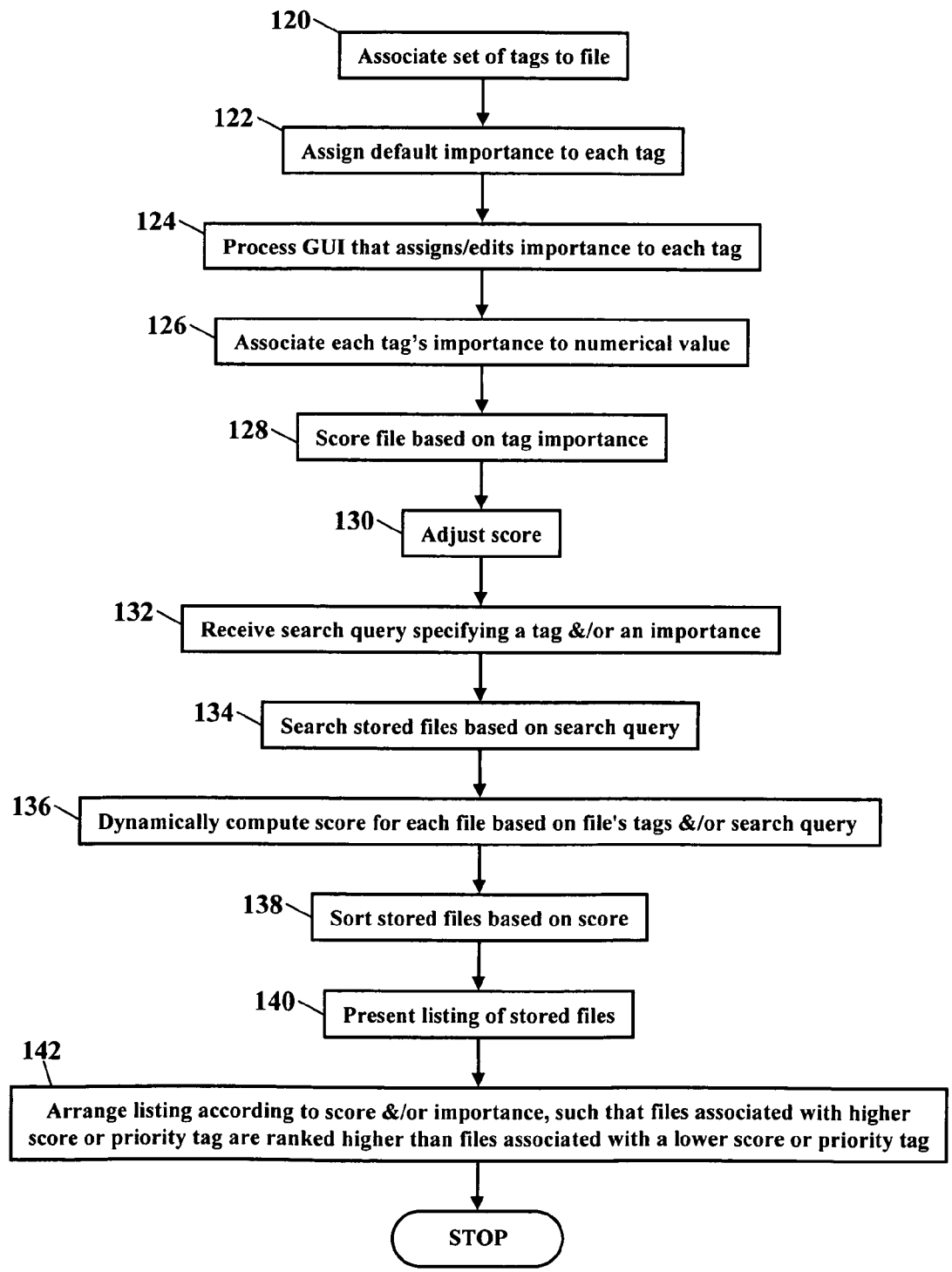
FIG. 7 is a flowchart illustrating another method of tagging files, according to additional aspects of the present invention.

FIG. 7 is a flowchart illustrating another method of tagging files, according to still more aspects of the present invention. A set of tags is associated to a file (Block 120). A default level of importance is assigned to each tag (Block 122). A graphical user interface is processed that assigns or edits a subjective level of importance for any tag (Block 124). Each tag's importance may be associated to a numerical value (Block 126). The file may be scored based on a tag's importance (Block 128), and the score may be adjusted (Block 130). A search query may be received that specifies a tag and/or an importance (Block 132). Stored files are searched based on the search query (Block 134). A score may be dynamically computed for each file based on the file's tags and/or the search query (Block 136). The stored files are sorted based on the score (Block 138). A listing of the stored files is presented (Block 140). The listing of stored files may be arranged according to score and/or importance, such that files associated with a higher score or priority tag are ranked higher than files associated with a lower score or priority tag (Block 142).

The media management application 14 may be physically embodied on storage media or in a computer-readable medium. This media may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable media could be distributed to end-users, licensees, and assignees. These types of computer-readable media, and other types not mentioned here but considered within the scope of the present invention, allow the media management application 14 to be easily disseminated. A computer program product comprises the media management application 14 stored on the computer-readable media. The media management application 14 comprises computer-readable instructions/code for tagging stored files, as hereinabove explained.

While the present invention has been described with respect to various aspects, features, principles, and exemplary embodiments, those skilled and unskilled in the art will recognize the present invention is not so limited. Other aspects, variations, modifications, and alternative embodiments may be made without departing from the spirit and scope of the present invention and are considered within the scope of the concepts disclosed herein and the invention as described by the claims.

What is claimed is:

1. A processor-implemented method of tagging files, comprising:
    associating a plurality of tags to a plurality of files, wherein a file of the plurality of files is associated with multiple tags of the plurality of tags;
    assigning an adjustable subjective level of importance to each tag of the plurality of tags, including the multiple tags, wherein a tag that is commonly assigned to different files may have different levels of importance such that the tag commonly assigned to the different files has a different weight for each file based on the adjustable subjective level of importance assigned to the tag; and
    generating a score for the file based on the adjustable subjective level of importance associated with each tag of the multiple tags.

2. A method according to claim 1, further comprising the step of processing a graphical user interface that assigns the adjustable subjective level of importance to a tag.

3. A method according to claim 1, further comprising the step of assigning a default level of importance to a tag.

4. A method according to claim 1, further comprising the step of storing a list of frequently-used tags and each tag's associated importance.

5. A method according to claim 1, further comprising the step of presenting a listing of the files, such that files associated with a higher score are ranked higher than files associated with a lower score.

6. A method according to claim 1, further comprising the step of searching the files based on the adjustable subjective level of importance of a tag.

7. A method according to claim 1, further comprising the step of associating a tag's level of importance to a numerical value.

8. A method according to claim 7, further comprising the step of summing numerical values associated with each tag.

9. A method according to claim 1, further comprising the step of computing the score using numerical values associated with a tag's importance.

10. A method according to claim 9, further comprising the step of sorting the files based on the score.

11. A method according to claim 9, further comprising the step of searching the files based on the score.

12. A method according to claim 9, further comprising the step of adjusting the score by a percentage multiplier associated with a designator.

13. A method according to claim 1, wherein the adjustable subjective level of importance is assigned to each tag of the plurality of tags using a graphical user interface.

14. A system, comprising:
    a media management application stored in memory; and
    a processor communicating with the memory and executing the media management application, the system associating a plurality of tags to a plurality of files, wherein a file of the plurality of files is associated with multiple tags of the plurality of tags, the system assigning an adjustable subjective level of importance to each tag of the plurality of tags, including the multiple tags, the system generating a score for the file based on the adjustable subjective level of importance associated with each tag of the multiple tags, wherein a tag that is commonly assigned to different files may have different levels of importance such that the tag commonly assigned to the different files has a different weight for each file based on the adjustable subjective level of importance assigned to the tag.

15. A system according to claim 14, wherein the system processes a graphical user interface that assigns the adjustable subjective level of importance to a tag.

16. A system according to claim 14, wherein the system presents a listing of the files, such that files associated with a higher score are ranked higher than files associated with a lower score.

17. A system according to claim 14, wherein the system searches the files based on the adjustable subjective level of importance of the tag.

18. A system according to claim 14, wherein the system associates a tag's level of importance to a numerical value.

* * * * *